(12) United States Patent
Wu et al.

(10) Patent No.: US 8,503,187 B2
(45) Date of Patent: Aug. 6, 2013

(54) COMPUTER SYSTEM HAVING DATA TRANSFER RATE INDICATION FUNCTION OF SERIAL ADVANCED TECHNOLOGY ATTACHMENT DUAL IN-LINE MEMORY MODULE

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 122 days.

(21) Appl. No.: 13/304,376

(22) Filed: Nov. 24, 2011

(65) Prior Publication Data
US 2013/0114200 A1    May 9, 2013

(30) Foreign Application Priority Data
Nov. 8, 2011    (CN) .......................... 2011 1 0349611

(51) Int. Cl.
*H05K 7/00* (2006.01)

(52) U.S. Cl.
USPC ...... 361/760; 361/784; 361/785; 361/679.31; 361/728

(58) Field of Classification Search
USPC ............. 361/760, 761.784, 785, 679.31, 728; 439/43, 45; 701/301
See application file for complete search history.

(56) References Cited

U.S. PATENT DOCUMENTS

| | | | | |
|---|---|---|---|---|
| 5,611,057 A | * | 3/1997 | Pecone et al. ................. | 710/301 |
| 5,793,617 A | * | 8/1998 | Dent ............................. | 361/785 |
| 8,423,695 B2 | * | 4/2013 | Purwin ........................ | 710/301 |

* cited by examiner

*Primary Examiner* — Timothy Thompson
*Assistant Examiner* — Andargie M Aychillhum
(74) *Attorney, Agent, or Firm* — Altis Law Group, Inc.

(57) ABSTRACT

A computer system includes a serial advanced technology attachment dual-in-line memory module (SATA DIMM) with a circuit board, a motherboard, and an indicating unit. An edge connector is set on a bottom edge of the circuit board to engage in a memory slot of the motherboard. A SATA connector is arranged on the circuit board and connected to a storage device interface of the motherboard. The indicating unit is connected to the motherboard for indicating the data transfer rates of the SATA DIMM module through two light emitting diodes.

8 Claims, 2 Drawing Sheets

COMPUTER SYSTEM HAVING DATA TRANSFER RATE INDICATION FUNCTION OF SERIAL ADVANCED TECHNOLOGY ATTACHMENT DUAL IN-LINE MEMORY MODULE

BACKGROUND

1. Technical Field

The present disclosure relates to a computer system having data transfer rate indication function of a serial advanced technology attachment dual in-line memory module (SATA DIMM).

2. Description of Related Art

Solid state drives (SSD) store data on chips instead of on moving magnetic or optical discs. One type of SSD has the form factor of a DIMM module and it is called a SATA DIMM module. The SATA DIMM module can be inserted into a memory slot of a motherboard, to add storage capacity. However, users cannot observe the data transfer rate of the SATA DIMM module when the SATA DIMM module is mounted into the computer system. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
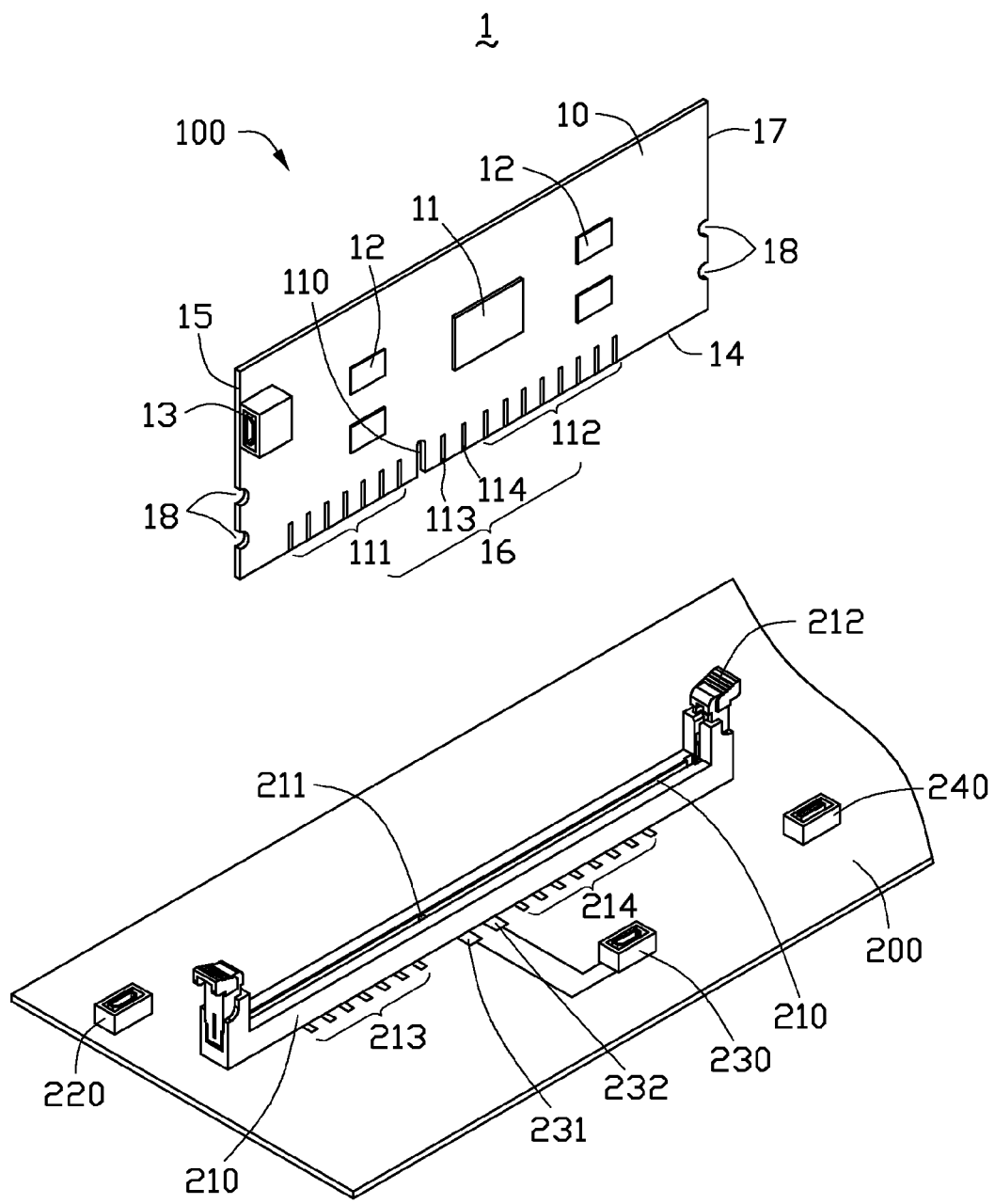
FIG. 1 is an exploded, isometric view of a computer system having a data transfer rate indication function relating to a serial advanced technology attachment (SATA) dual in-line memory module (DIMM), in accordance with an exemplary embodiment of the present disclosure.
Figure 2:
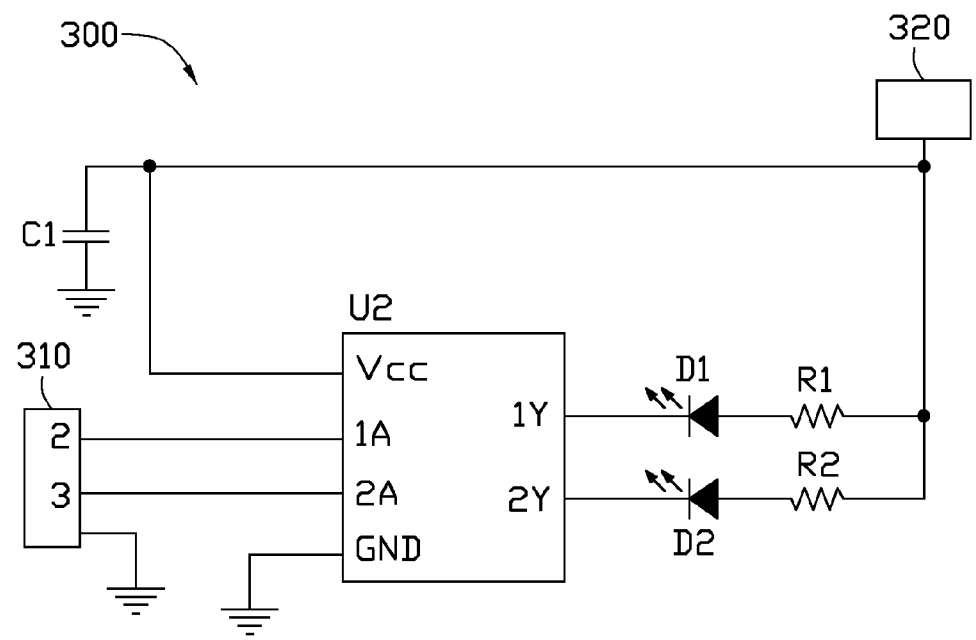
FIG. 2 is a circuit diagram of the indication unit of the computer system of FIG. 1.

Referring to FIGS. 1 and 2, a computer system 1 in accordance with an exemplary embodiment includes a serial advanced technology attachment dual-in-line memory module (SATA DIMM) module 100, a motherboard 200, and an indication unit 300.

The module 100 includes a substantially rectangular circuit board 10. A control chip 11, a plurality of storage chips 12 connected to the control chip 11, and a SATA connector 13 connected to the control chip 11 are all arranged on the circuit board 10. An edge connector 16 is arranged on a bottom edge 14 of the circuit board 10 and a notch 110 is defined towards one end of the bottom edge 14. The edge connector 16 includes a plurality of power pins 111, a plurality of ground pins 112, and two indication signal pins 113 and 114. The power pins 111 are connected to the control chip 11 and the storage chips 12. The ground pins 112 are connected to a ground layer (not shown) of the circuit board 10. The indication signal pins 113 and 114 are connected to input/output (I/O) pins GPIO14 and GPIO15 respectively of the control chip 11. Two grooves 18 are defined in two opposite ends 15 and 17 of the circuit board 10.

A memory slot 210, such as a double data rate type three (DDR3) or a double data rate type two (DDR2) memory slot, a storage device interface 220, a connecting interface 230, and a power interface 240 are all arranged on the motherboard 200. The memory slot 210 includes a plurality of internal pins and a protrusion 211. The pins includes a plurality of power pins 213 corresponding to the power pins 111, a plurality of ground pins 214 corresponding to the ground pins 112, and two indication signal pins 231 and 232 corresponding to the indication signal pins 113 and 114 of the circuit board 10. The power pins 213 and the ground pins 214 are respectively connected to a power layer (not shown) and to a ground layer (not shown) of the motherboard 200. The indication signal pins 231 and 232 are connected to the connecting interface 230. Two fixing elements 212 are arranged at opposite ends of the memory slot 210.

The indicating unit 300 is arranged on a printed circuit board, and includes a connecting interface 310, a power interface 320, a buffer U2, a capacitor C1, light emitting diodes (LEDs) D1 and D2, and resistors R1 and R2. Pins 2 and 3 of the connecting interface 310 are respectively connected to input pins 1A and 2A of the buffer U2. A voltage pin VCC of the buffer U2 is connected to the power interface 320 and also connected to a first end of the capacitor C1. A second end of the capacitor C1 is grounded. An output pin 1Y of the buffer U2 is connected to a cathode of the LED D1. An anode of the LED D1 is connected to the power interface 320 through the resistor R1. An output pin 2Y of the buffer U2 is connected to a cathode of the LED D2. An anode of the LED D2 is connected to the power interface 320 through the resistor R2. The buffer U2 prevents the indication unit 300 from being damaged by an over-current.

In use, the edge connector 16 is inserted into the memory slot 210. The power pins 111 are connected to the power pins 213, the ground pins 112 are connected to the ground pins 214, and the indication signal pins 113 and 114 are connected to the indication signal pins 231 and 232. The protrusion 211 engages in the notch 110. The fixing elements 212 are engaged in the grooves 18. The SATA connector 13 is connected to the storage device interface 220 by a cable (not shown). At the same time, the connecting interface 310 is connected to the connecting interface 230. The power interface 320 is connected to the power interface 240. The location of the indicating unit 300 is such that the LEDs D1 and D2 are exposed and visible through the front panel of the computer system.

When the motherboard 200 receives power, the motherboard 200 outputs a voltage to the control chip 11 and the storage chips 12 through the power pins 213 and 111. At the same time, the motherboard 200 outputs a signal, such as a SATA signal to the control chip 11 through the storage device interface 220 and the SATA connector 13, to control the storage chips 12 to store data. When the module 100 is operating at a first data transfer rate, such as a 3 gigabytes per second (GB/S), the I/O pin GPIO14 of the control chip 11 outputs a low level signal to the input pin 1A of the buffer 2 through the indication signal pins 113 and 231, and the connecting interface 230 and 310. Thus the output pin 1Y of the buffer U2 outputs a low level signal. The LED D1 is lit, to indicate that the data transfer rate of the module 100 is 3 GB/S. When the module 100 is at a second data transfer rate, such as a 6 GB/S, the I/O pin GPIO15 of the control chip 11 outputs a low level signal to the input pin 2A of the buffer U2 through the indication signal pins 114 and 232, and the connecting interface 230 and 310. The output pin 2Y of the buffer U2 then outputs a low level signal. The LED D2 is lit, to indicate a data transfer rate of 6 GB/S.

The visible indication of the data transfer rate of the module 100 as revealed by the LEDs D1 and D2 of the indication unit 300 is easy to see and useful.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A computer system, comprising:
a motherboard comprising:
    a storage device interface;
    a first connecting interface;
    a first power interface; and
    a memory slot comprising:
        a plurality of first power pins, a plurality of first ground pins, and first and second indication signal pins, wherein the first and second indication signal pins are connected to the first connecting interface;
a serial advanced technology attachment dual-in-line memory module (SATA DIMM) comprising:
    a circuit board comprising:
        an edge connector set on a bottom edge of the circuit board engaged in the memory slot, the edge connector comprising a plurality of second power pins connected to the first power pins, a plurality of second ground pins connected to the first ground pins, and third and fourth indication signal pins connected to the corresponding first and second indication signal pins;
    a control chip arranged on the circuit board and connected to the plurality of second power pins of the edge connector, wherein the control chip comprises first and second input/output (I/O) pins, the first and second I/O pins of the control chip are connected to the corresponding third and fourth indication signal pins;
    a plurality of storage chips arranged on the circuit board, and connected to the plurality of second power pins and the control chip; and
    a SATA connector arranged on the circuit board, and connected to the control chip and the storage device interface of the motherboard; and
an indication unit comprising:
    a second connecting interface connected to the first connecting interface;
    a second power interface connected to the first power interface;
    a first light emitting diode (LED); and
    a second LED;
wherein two pins of the second connecting interface are respectively connected to cathodes of the first and second LEDs, anodes of the first and second LEDs are connected to the second power interface, when the SATA DIMM module is at a first data transfer rate, the first I/O pin of the control chip outputs a low level signal to the cathode of the first LED through the third indication signal pin, the first indication signal pin, the first and second connecting interfaces, the first LED is lit; when the SATA DIMM module is at a second data transfer rate, the second I/O pin of the control chip output a low level signal to the cathode of the second LED through the fourth indication signal pin, the second indication signal pin, and the first and second connecting interfaces, the second LED is lit.

2. The computer system of claim 1, wherein the memory slot is a double data rate type three (DDR3) memory slot.

3. The computer system of claim 1, wherein the memory slot is a double data rate type two (DDR2) memory slot.

4. The computer system of claim 1, wherein a notch is defined in the bottom edge of the circuit board, the memory slot comprises a protrusion engaged in the notch.

5. The computer system of claim 1, wherein the circuit board is a rectangular, two grooves are defined in two opposite ends of the circuit board, two fixing elements are arranged at two opposite ends of the memory slot, to engage in the grooves of the circuit board.

6. The computer system of claim 1, wherein the indication unit further comprises a buffer, two input pins of the buffer are connected to two pins of the second connecting interface, two output pins of the buffer are connected to the cathodes of the first and second LEDs, a voltage pin of the buffer is connected to the second power interface and also connected to a first end of a capacitor, a second end of the capacitor is grounded.

7. The computer system of claim 1, wherein the indication unit further comprises first and second resistors, the first resistor is connected between the anode of the first LED and the second power interface, the second resistor is connected between the anode of the second LED and the second power interface.

8. The computer system of claim 1, wherein the first data transfer rate is 3 gigabytes per second (G/S), the second data transfer rate is 6 G/S.

* * * * *